Oct. 8, 1940.  F. TAUB  2,217,390
DRY HEAT THERMOPLASTIC-DENTURE PRESS
Filed Nov. 25, 1938  2 Sheets-Sheet 1
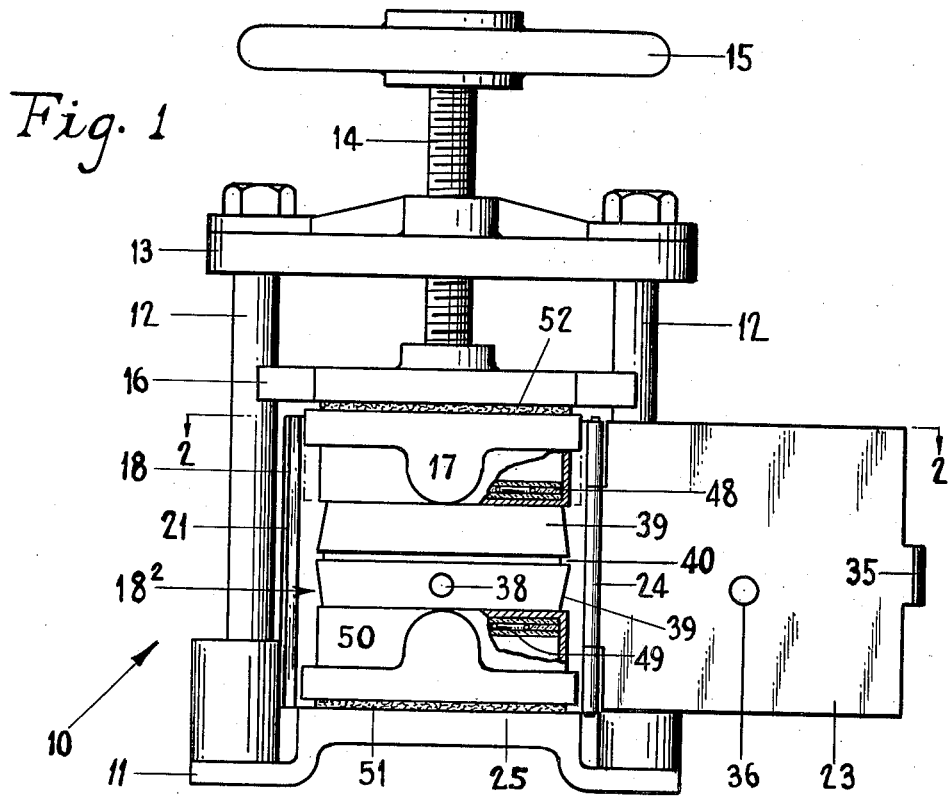
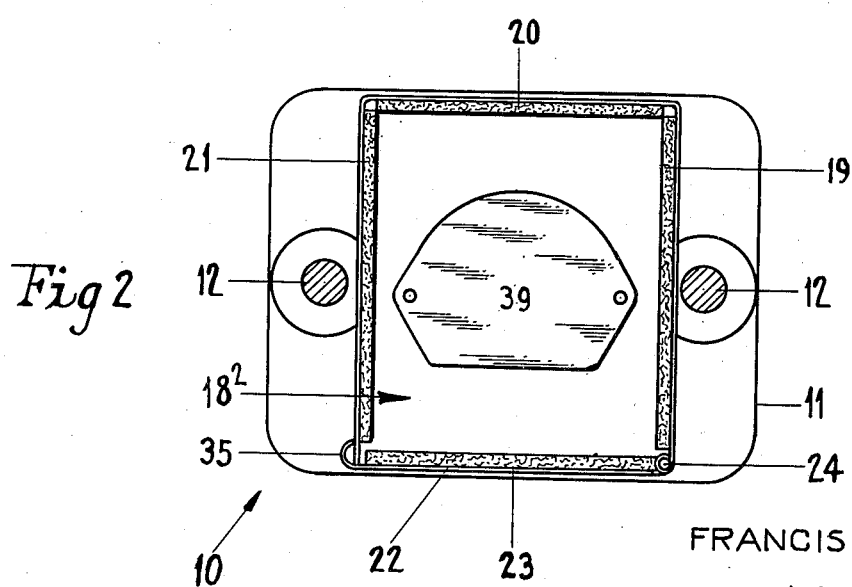
FRANCIS TAUB
INVENTOR.
BY Joseph Blacker
ATTORNEY.

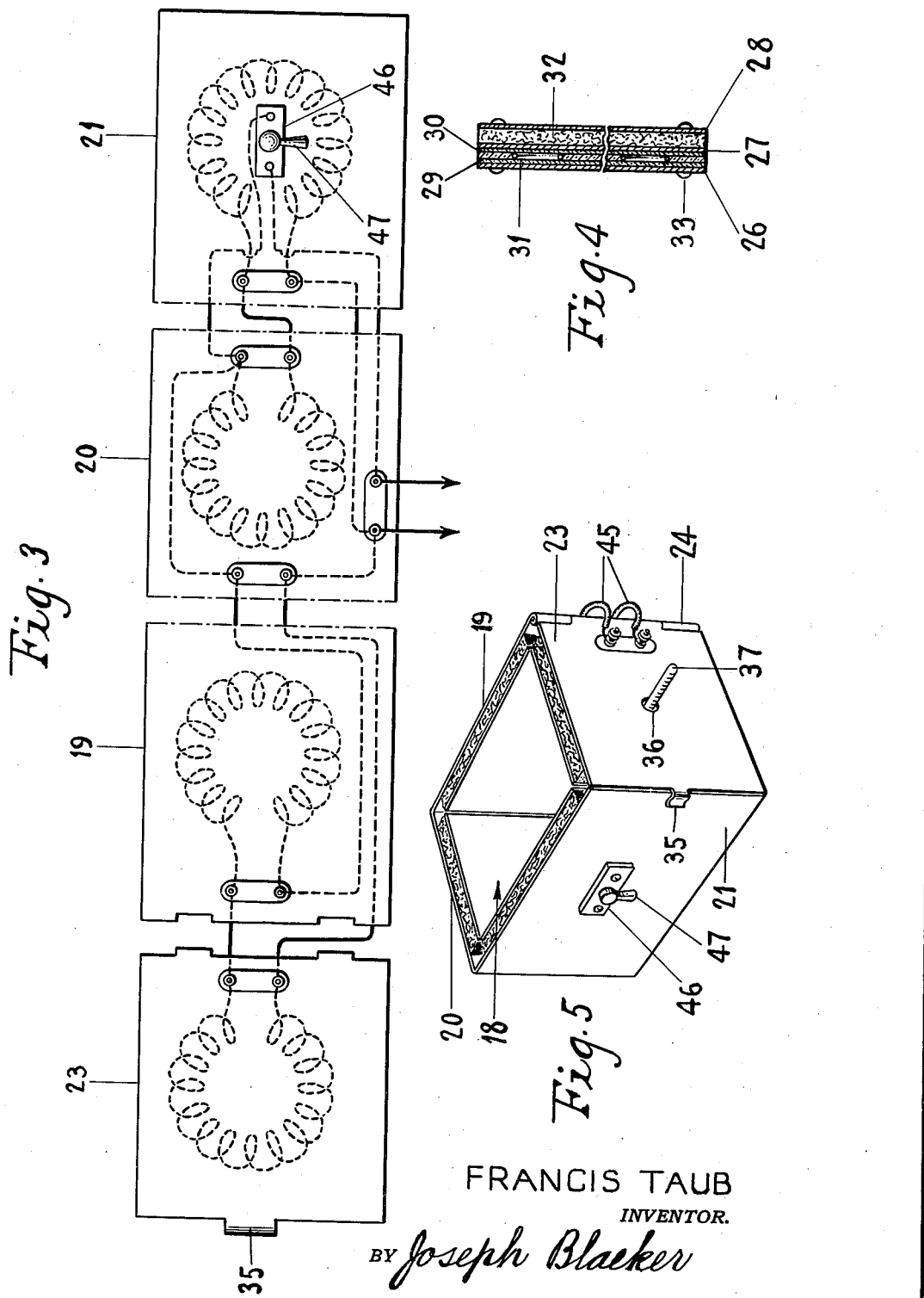

Patented Oct. 8, 1940

2,217,390

UNITED STATES PATENT OFFICE 2,217,390

DRY HEAT THERMOPLASTIC-DENTURE PRESS

Francis Taub, Brooklyn, N. Y.

Application November 25, 1938, Serial No. 242,186

7 Claims. (Cl. 219—35)

This invention relates to a dry heat thermoplastic-denture press in which a flask carrying a denture mold and thermoplastic material will be uniformly heated for avoiding the possibility of damage to the thermoplastic material or denture.

Thermoplastics used for the construction of dentures, especially those of the resin type, are pressed into a refractory mold, such as plaster, by means of a dry heat press. The heat necessary to plasticise the said thermoplastic material is presently generated in the base and top of the press, and then transmitted through the mold to the denture material. The plaster mold, being a bad heat conductor, does not transmit the heat evenly to the thermoplastic material, and the results so obtained are unsatisfactory.

If the thermoplastic material is molded before being heated throughout to the molding temperature, the thermoplastic denture will be in a strained condition. The strength of certain portions of it will be reduced to such an extent that it will crack under the continued stresses of use. If pressed at the correct temperature no strains will be present and the full strength of the material will be maintained.

Different compounds of thermoplastic materials such as resins have different but definite molding temperatures at which the thermoplastic denture material will be soft enough to mold without strains being developed in the finished denture.

An object of this invention is to provide a dry heat dental press wherein the heat will be confined within the press and directed to the mold and thermoplastic material.

Another object of this invention is to provide a dry heat dental press having a heating enclosure with heating elements embedded in all sides thereof, the said heating elements being heated by electric conducting wires arranged so that all the side walls of the press will be heated to identical temperatures.

Another object of this invention is to provide a dry heat dental molding press in which a flask containing a refractory mold and thermoplastic denture material is surrounded on all sides and heated on all sides so that the pressing process takes place in an atmosphere the temperature of which is like the molding temperature of the thermoplastic material under treatment in the press.

Another object of this invention resides in the arrangement of parts whereby the heating enclosure will closely surround the plunger of the press but will permit the plunger to move down between the walls of the enclosure and so that under operating conditions the external cool air will not enter the enclosure and affect the heated chamber wherein the denture material is properly processed.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a front elevation of the dry heat press with the door of the heating enclosure in open position.

Figure 2 is a cross-sectional view, the section being taken as on line 2—2 in Figure 1.

Figure 3 is a diagrammatic illustration of the electrical connections for the heating enclosure.

Figure 4 is an enlarged fragmentary cross-sectional view of a typical side wall of the heating enclosure.

Figure 5 is a perspective view of the heating enclosure.

In the illustrated embodiment of the invention, the numeral 10 indicates a dry heat thermoplastic-denture press, comprising a base or stationary bed 11 which supports two upright posts 12, 12, having a stationary cross-head 13 secured to the upper ends thereof.

A spindle 14 has been threadably mounted in the cross-head 13 and has a handwheel 15 secured to its upper end. Secured to the lower end of the spindle 14 is a movable cross-head 16 which is slidably mounted between the posts 12 and carries a plunger 17 for movement to and from the base 11.

A heating enclosure 18 has been mounted on an upper extension of the base 11 and comprises a frame preferably of rectangular form and which is open at the top and bottom. As best shown in Figure 2, the heating enclosure 18 has three upright walls 19, 20, and 21, which are fixed relative to each other and form an opening 22 in one face. A door 23 has been pivotally mounted on hinge elements 24 to close the opening 22.

As shown in Figure 1, the heating enclosure 18 is designed to enclose the bed extension 25 and the plunger 17 and form a heating chamber $18^2$ closed on all sides.

As shown in Figure 4, which shows an enlarged cross-sectional view of a typical side wall forming the heating enclosure 18, the wall is built up of three metal plates 26, 27, 28, two mica plates 29 and 30, an electric wire heating unit 31, and a layer of asbestos 32.

The metal plates 26 and 27 and 28 are held together by rivets 33 which also hold the mica plates 29 and 30, and the electric heating unit 31 in operative relation. The heating units may each be in the form of a coil, as shown. The wire is wound around an annular mica member (not shown) as is well known in the art. The electric heating unit is thus insulated by the mica from the metal plates and is concealed within the walls 19, 20 and 21 and within the door or closure 23.

The door 23 is pivotally connected along one of its vertical edges to the side wall 19 by means of a hinge 24 and is designed to be secured to the side wall 21 by means of a spring clip 35. The door has an aperture 36 through which a thermometer 37 may be passed into an aperture 38 in the lower half of a flask 39 containing an artificial stone mold and thermoplastic material 40 to be treated and molded into the desired denture.

As shown in Figures 3 and 5, the heating unit in the door 23 is electrically connected with the heating units in the side walls 19, 20 and 21 by externally disposed electric wiring 45.

As shown in Figures 3 and 5, a thermostat 46 has been electrically connected in the wiring connecting the heating units. The thermostat well known in the art, serves to automatically open the circuit when the temperature generated by the heating elements reaches a pre-determined temperature at which the material being treated becomes sufficiently plastic for the purposes intended. The thermostat 46 has an externally positioned handle 47 by means of which the operator may set the temperature range at which the circuit will be automatically cut out.

The mica jacket about the heating units forms a shield which insulates and prevents short circuiting of the heating units when charged and makes it possible to have walls occupying the least space, that is without the necessity of an air space between the electric mica insulation and the asbestos heat insulation.

In operation, a metal flask 39 containing an artificial stone mold and thermoplastic material 40 to be processed, is placed so as to contact directly with the upper and lower heating surfaces preferably while at room temperature in the dry heat press 10 which has been pre-heated to the molding temperature of the thermoplastic denture material. The door 23 is closed and the thermometer 37 is passed through the aperture 36 in the door into the aperture 38 in the flask 39.

When the thermometer 37 indicates that the temperature inside the mold is that at which the thermoplastic material is at its molding temperature, the operator rotates the handwheel 15 and compresses the denture material. This compression is continued until the upper half of the flask 39 contacts the lower half of the flask. The thermometer is removed, the current is shut off and the door 23 is opened to allow cold air to enter into the chamber $18^2$ so as not to subject the plastic material to any excess in duration of time of heating. The handwheel is then rotated to release the flask which is then removed from the press.

It is to be noted that the opening of the door serves to start the cooling immediately at completion of the processing and quickly relieves the heated denture material from excess duration in heating conditions. The opening of the door and the resultant entrance of cold air counteracts the retaining of heat due to the heat insulated walls of the enclosure 18. It is to be noted that the press 10 has heating elements 48 and 49 positioned respectively inside the plunger 17 and inside a heating member 50 resting on asbestos 51 on the extension 25 of the bed 11. It is to be understood that the heating elements 48 and 49 are suitably connected to a source of electric current (not shown). A layer of asbestos 52 insulates the plunger 17 from transmitting heat to the cross-head 16. The importance of the heating enclosure resides in the fact that the thermoplastic denture material receives heat not only from the top and bottom but also from all four sides and so that the heat need not be forced through the denture material at high temperature. My improved heating appliance makes it possible to mold without internal strains being developed in the denture.

In accordance with the patent statutes I have described and illustrated the preferred embodiment of my invention, but it will be understood that various changes and modifications can be made therein without departing from the spirit of the invention as defined by the appended claims.

I claim:

1. In a dry heat thermoplastic-denture press comprising a stationary bed and a stationary upper cross-head and a movable intermediate plunger, separate electric heating elements carried by said plunger and by said bed, an upright heating enclosure mounted on said bed and comprising upright walls and having an opening in one face thereof, a vertically hinged closure pivotally mounted in said opening, each of said walls and said closure having a separate heating element imbedded therein, said heating elements being arranged in circuit in multiple series to cause each of said elements to radiate an equal amount of heat, thermostatic control means for opening and closing said circuit and maintaining a predetermined temperature in said enclosure, said press having means for causing said movable plunger to exert pressure against said bed, said heating enclosure being adapted to enclose said upper and lower heating elements and forming a heating chamber closed on all sides, said enclosure having an outer covering layer of heat insulating material for confining the heat generated by all of said heating elements within said chamber whereby heat is caused to be uniformly transmitted towards the center of said heating chamber from all sides.

2. In a dry heat thermoplastic dental press comprising a stationary bed and a stationary upper cross-head and a movable intermediate plunger, separate electric heating elements carried by said plunger and by said bed, a heating enclosure comprising upright walls and an opening in one face thereof, a closure pivotally mounted in said opening, each of said walls and said door having a separate electric heating element imbedded therein, said heating elements being arranged in circuit, thermostatic control means for opening and closing said circuit and maintaining a predetermined temperature in said enclosure, said press having means for causing said movable plunger to exert pressure against said bed, said heating enclosure being adapted to enclose said upper and lower heating elements and forming a heating chamber closed on all sides, said enclosure having an outer covering layer of heat insulating material for confining the heat generated by said elements within said chamber.

3. In a dry heat thermoplastic dental press comprising a stationary bed and a stationary upper cross-head and a movable intermediate plunger, separate electric heating elements carried by said plunger and by said bed, a heating enclosure open at the top and bottom and comprising upright walls and an opening in one face thereof, a closure pivotally mounted in said opening, each of said walls and said closure having a concealed and insulated electric heating element imbedded therein, said heating elements being arranged in circuit, said press having means for causing said movable plunger to exert pressure against said bed, said bed having an upper extension, said heating enclosure being adapted to receive and enclose said upper and lower heating elements and forming a heating chamber closed on all sides, thermostatic control means for opening and closing said circuit and maintaining a predetermined temperature in said chamber, said enclosure having a layer of heat insulating material for confining the heat generated by said heating elements within said chamber.

4. In a dry heat thermoplastic dental press comprising a stationary bed and a stationary upper cross-head and a movable intermediate plunger, separate electric heating elements carried by said plunger and by said bed, a heating enclosure open at the top and bottom and comprising upright walls and an opening in one face thereof, a closure pivotally mounted in said opening, each of said walls and said closure having a concealed and insulated electric heating element imbedded therein, said heating elements being arranged in circuit, said press having means for causing said movable plunger to exert pressure against said bed, said bed having an upper extension, said heating enclosure being adapted to receive and enclose said upper and lower heating elements and forming a heating chamber closed on all sides, thermostatic control means for automatically opening and closing said circuit and maintaining a predetermined temperature in said chamber, adjusting means positioned externally of said enclosure for setting the temperature range for controlling the temperature in said enclosure, said enclosure having a layer of heat insulating material for confining the heat generated by said heating elements within said chamber.

5. In a dry heat thermoplastic dental press comprising a stationary bed and a stationary upper cross-head and a movable intermediate plunger, separate electric heating elements carried by said plunger and by said bed, a heating enclosure open at the top and bottom and comprising upright walls and an opening in one face thereof, a closure pivotally mounted in said opening, each of said walls and said closure having a concealed and insulated electric heating element imbedded therein, said heating elements being arranged in circuit, said press having means for causing said movable plunger to exert pressure against said bed, said bed having an upper extension, said heating enclosure being adapted to receive and enclose said upper and lower heating elements and forming a heating chamber closed on all sides, thermostatic control means for automatically opening and closing said circuit and maintaining a predetermined temperature in said chamber, adjusting means positioned externally of said enclosure for setting the temperature range for controlling the temperature in said enclosure, said enclosure having a layer of heat insulating material for confining the heat generated by said heating elements within said chamber, said press having separate electric heating elements in said plunger and in said bed.

6. In a dry heat press of the character described comprising a stationary pressure resisting surface and a stationary upper cross-head and a movable intermediate plunger, separate electric heating elements carried by said plunger and by said pressure resisting surface, a heating enclosure comprising upright walls, each of said walls having a separate electric heating element imbedded therein, said heating elements being arranged in circuit, thermostatic control means for opening and closing said circuit and maintaining a predetermined temperature in said enclosure, said press having a vertically movable plunger adapted to exert pressure against said surface, said heating enclosure being adapted to enclose said surface and said plunger and forming a heating chamber closed on all sides, said enclosure having a layer of heat insulating material for confining the heat generated by all of said heating elements within said chamber whereby heat is caused to be uniformly transmitted towards the center of said heating chamber from all sides.

7. In a dry heat press comprising a stationary pressure resisting surface and a cross-head and a movable plunger, separate electric heating elements carried by said plunger and by said pressure resisting surface, an enclosure comprising four upright walls, each of said walls having a separate electric heating element imbedded therein, said press having a single threaded means designed for manually actuating said plunger to exert pressure against said surface, said enclosure being adapted to enclose said surface and said plunger and forming a chamber closed on all sides, said enclosure having layers of heat insulating material for confining within said chamber the heat generated by all of said heating elements, whereby heat is caused to be uniformly transmitted towards the center of said heating chamber from all sides thereof simultaneously with the application of pressure against said pressure resisting surface, said press being designed to receive a denture mold in direct contact with said heated pressure resisting and plunger surfaces.

FRANCIS TAUB.